P. M. H. LANGE.
FRICTION CLUTCH.
APPLICATION FILED DEC. 26, 1907.

900,397.

Patented Oct. 6, 1908.

3 SHEETS—SHEET 1.

Witnesses:

Inventor:
Paul M. H. Lange
by Robt. B. Wilson
his Attorney

P. M. H. LANGE.
FRICTION CLUTCH.
APPLICATION FILED DEC. 26, 1907.

900,397.

Patented Oct. 6, 1908.

3 SHEETS—SHEET 3.

Witnesses:

Inventor.
Paul M. H. Lange
by Robt. B. Wilson
his attorney

UNITED STATES PATENT OFFICE.

PAUL M. H. LANGE, OF TOLEDO, OHIO, ASSIGNOR TO THE TOLEDO MACHINE AND TOOL COMPANY, OF TOLEDO, OHIO.

FRICTION-CLUTCH.

No. 900,397.   Specification of Letters Patent.   Patented Oct. 6, 1908.

Application filed December 26, 1907. Serial No. 408,210.

*To all whom it may concern:*

Be it known that I, PAUL M. H. LANGE, a citizen of Germany, residing at Toledo, in the county of Lucas and State of Ohio, have invented a new and useful Improvement in Friction-Clutches, of which the following is a specification.

My invention relates to a friction clutch, and has for its object to provide an efficient and reliable device of the kind that is adapted to frictionally revolve a pinion, gear wheel, or pulley, loosely mounted on a shaft, with the shaft.

A further object is to provide a convenient and safe device of the kind and for the purpose, having large areas of opposed surfaces adapted to be subjected to directly opposed pressure, and that is adjustable to take up the wear of the surfaces.

A further object is to provide a friction clutch that is adapted to engage moving with non-moving parts, and transmit the motion of the one to the other without shock.

A further object is to provide a device of the kind, which when engaged releases the pressure from the sleeve and lever by which the frictional parts are thrown into engagement and compressed together.

Figure 1:
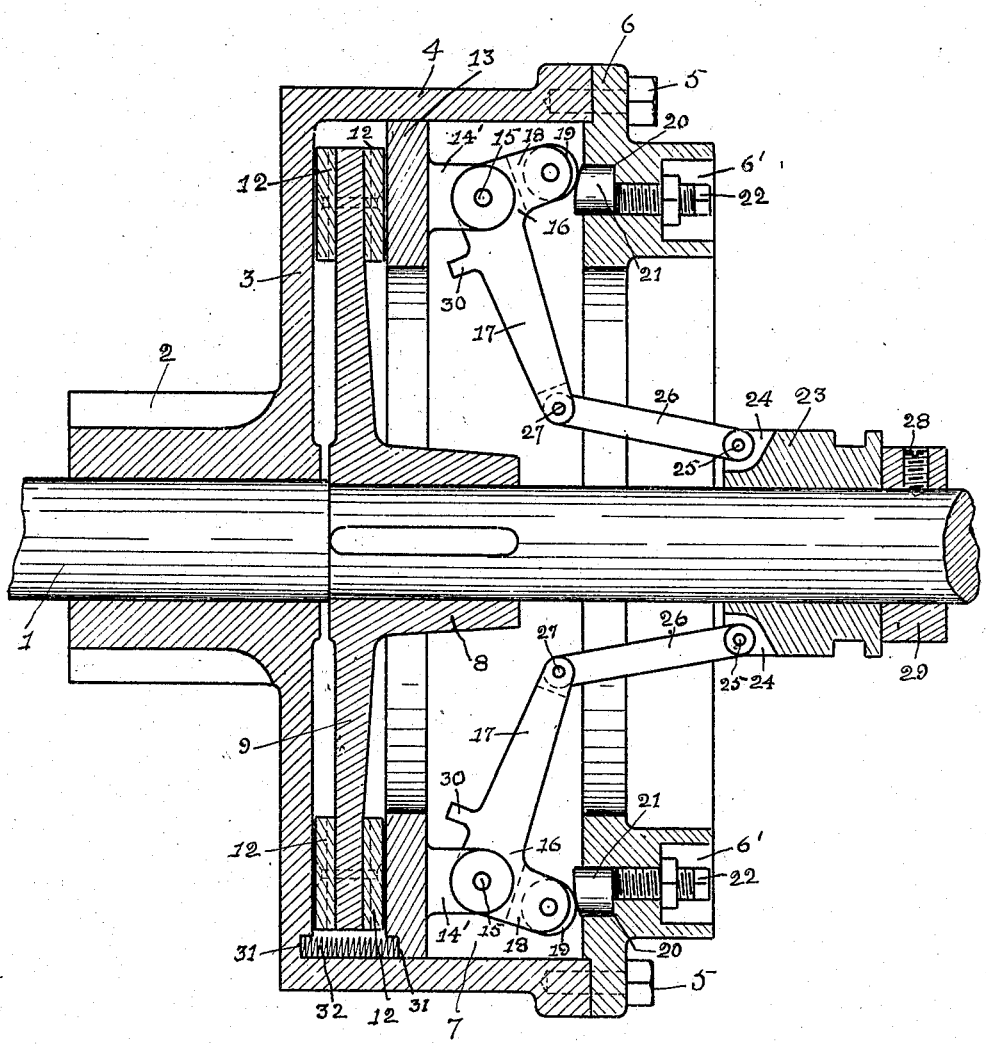
Figure 2:
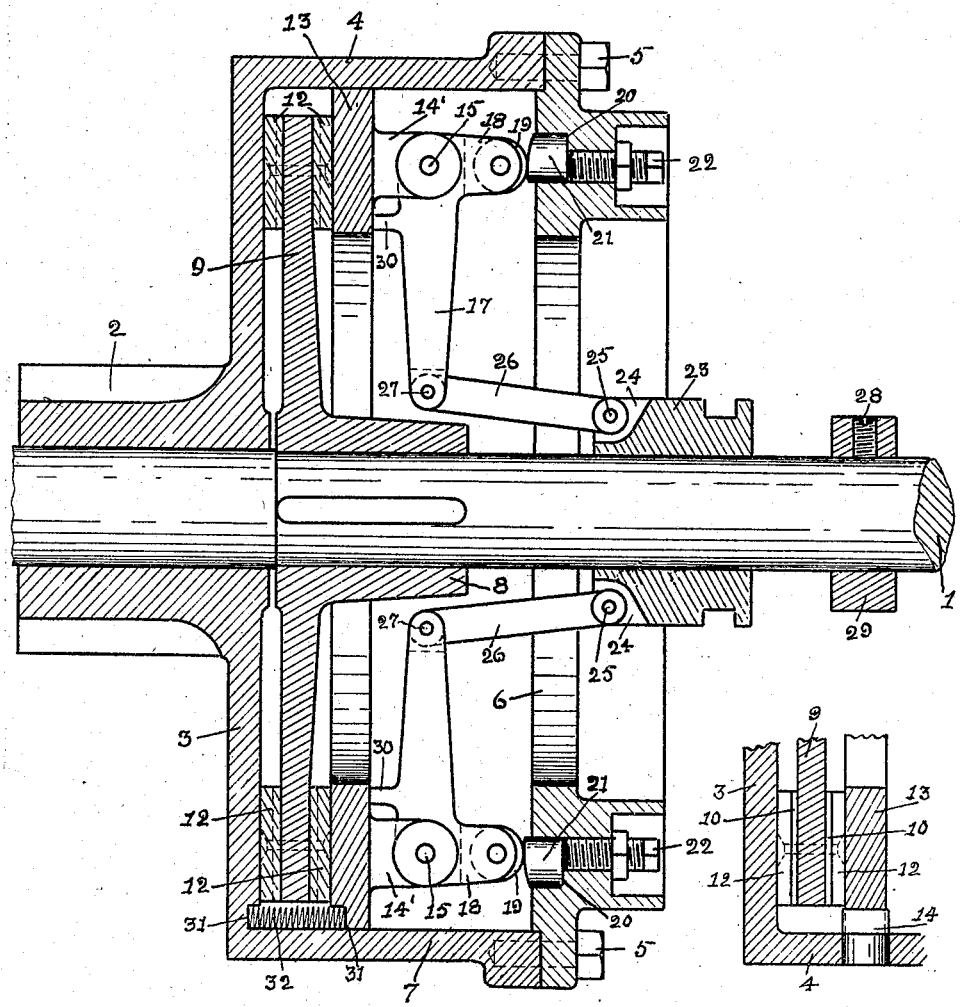
Figure 3:
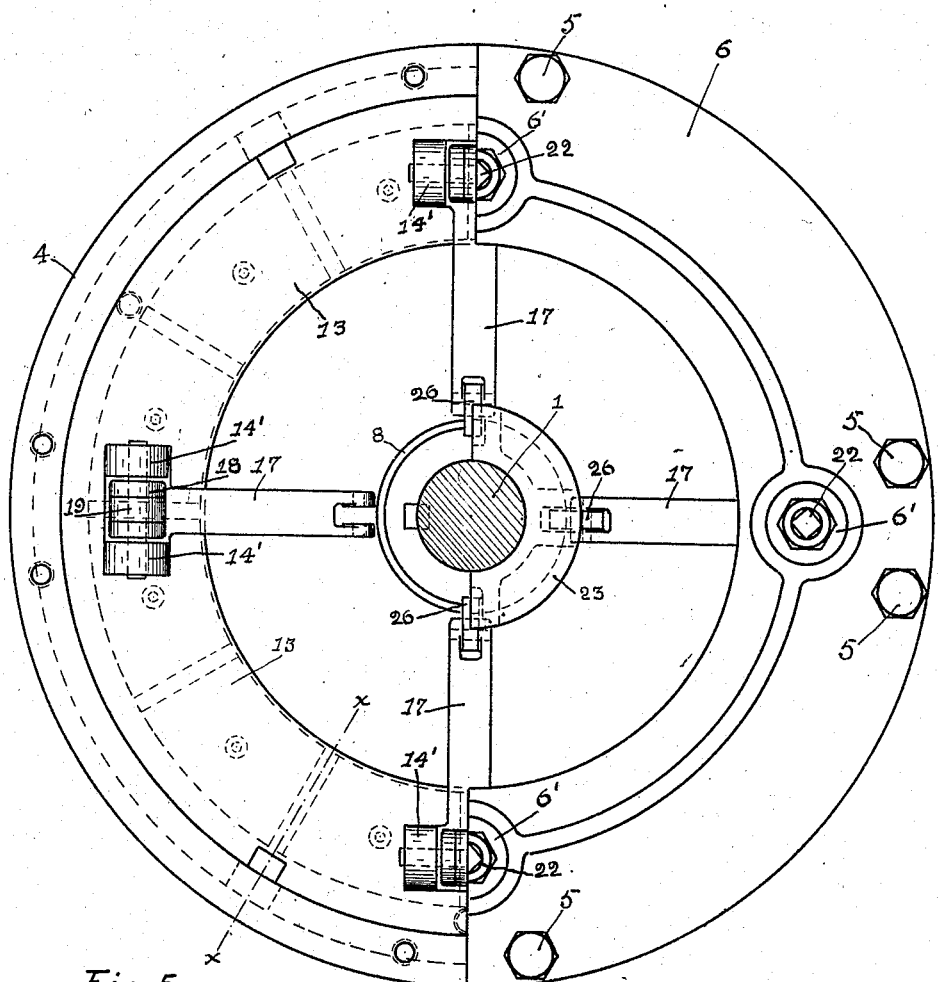
Figure 5:
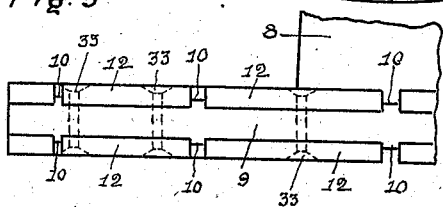

I accomplish these objects by the construction and combination of parts as hereinafter described and illustrated in the drawings, in which Figure 1 is a view in longitudinal section of a friction clutch constructed in accordance with my invention, showing the parts in released position. Fig. 2 is a similar view showing the parts in frictionally engaged position. Fig. 3 is an end view of the friction cylinder with one-half the annular friction ring. Fig. 4 is a cross section of Fig. 3 on line x—x. Fig. 5 is a broken away portion of the periphery of the friction disk.

In the drawings 1 designates a shaft, upon which is loosely mounted a pinion 2, forming a hub for the end disk 3, of suitable diameter, and provided with the cylindrical flange 4, to the outer end of which is attached by the bolts 5, the annular plate 6, the whole forming a casing 7 around and concentric to the shaft 1. Within the cylindrical casing 7, and between the disk 3 and the annular end plate 6, there is fixedly mounted on the shaft 1 by the hub 8, the friction disk 9, of less diameter than the disk 3, and having the radial ribs 10, and the friction segments 12 secured between the ribs on each side of the disk, around and flush with the circumference of the disk. Between the friction disk 9 and the annular plate 6, there is movably inserted in the casing 7, the annular friction ring 13, of a diameter to move as a piston in the casing. At intervals around the periphery of the ring 13, is provided cross incuts to receive the guide pins 14 projecting radially inward from the cylindrical flange 4, and having the projecting portions squared to enter the incuts and permit lateral movement of the ring in the casing. The ring 13 is provided at regular intervals of its outer side with projecting bifurcated lugs 14', having alined bores to receive the pins 15 upon which are pivotally mounted the bell cranks 16, the longer arms 17 of which extend inward towards the shaft 1, and the shorter arms 18 extend outward towards the annular end plate 6. The outer ends of the arms 18 are provided with the rollers 19, and opposite the bifurcated lugs 14' the annular end plate 6 of the casing is provided with the sockets 20 in which are mounted the plugs 21, having their inner ends hardened and formed slightly cam faced for engagement by the rollers of the arms 18, of the bell cranks, and opposite the plugs the annular plate 6 is provided with the adjusting screws 22 by which the plugs 21 are adjusted inwardly. In order that the heads of the screws 22 may not form dangerous projections from the casing, they are preferably recessed in sockets 6' formed in the end plate.

On the shaft 1 is mounted, adjacent to the open end of the casing, a grooved sleeve 23 which at the end next the casing is provided with the incuts 24 within which are pivotally mounted by the pins 25 the outer ends of links 26, which at their opposite ends are pivotally connected by the pins 27 to the bifurcated lower ends of the bell crank arms 17. Adjacent to the outer end of the sleeve 23 there is mounted and fixed on the shaft by a set screw 28 a stop collar 29. To the groove of the sleeve is attached in the customary manner a lever (not shown) which is fulcrumed to move the sleeve back and forth along the shaft 1.

The friction disk 9 is located in near proximity to the end disk 3 of the casing with the friction segments 12 of one side between the two disks and requiring only slight movement of the casing lengthwise of the shaft to bring the segments and the end disk 3 into frictional contact. The friction ring 13 is located in the casing in near proximity to the friction segments 12 of the other side of the disk 9 and requiring only slight movement of the ring 13 to bring it into frictional engagement with the outer friction segments 12 or to release it therefrom. The longer arms 17 of the bell cranks are provided near their pivotal connection to the friction ring 13 with the stop lugs 30, which when the arms 27 are slightly over their pivotal centers, engage the outer face of the ring 13 and limit further throw of the arms inward. Between the disk 3 and the ring 13, at regular intervals around the periphery of the disk 9, in suitable shallow socket bores 31, formed oppositely in the disk and the ring, are inserted the helical springs 32, which are adapted normally to hold the disk 3 and the ring 13 slightly out of engagement with the friction segments 12 of the disk 9. The springs 32 yield to the pressure of the bell cranks, but when the pressure is released the springs operate to separate the disk 3 and the ring 13 from contact with the segments, so that when released there is no friction or wear of the parts.

Thus constructed, when the parts are in position as shown in Fig. 1, the friction segments 12 are slightly separated by the springs 32 from the disk 3 of the casing and the ring 13. By throwing the sleeve 23 inward towards the casing, the arms 27 of the bell cranks are moved inward by the links 26 until the lugs 30 of the arms are engaged with the plate 13, as shown in Fig. 2, in which position the rollers of the arms 18 of the bell cranks are moved over the cam faces of the plugs 21, whereby the disk 3 of the casing is drawn towards the disk 9 and the ring 13 is pushed in the opposite direction until both are pressed against the friction segments 12, the toggle like action of the arms 18 and the plugs 21 producing strong pressure in directly opposed directions on the segments 12 of both sides of the disk 9, which are thereby clamped as in a vise, and the friction produced rotates the casing and sleeve with the disk 9, thereby revolving the pinion 2 with the shaft. The arms 17 of the bell cranks being over their pivotal centers, the pressure produced by the arms 18 in direct alinement with the plugs 21 and their pivotal centers, tends to move the arms 17 towards the ring 13 and to prevent any back pressure on the sleeve and the operating lever, whereby, when the parts are in position as shown in Fig. 2, there is no pressure or strain on the sleeve and the lever, and the tendency of the pressure created is to hold the parts in frictional engagement.

By my construction the friction may be gradually increased by the lever until it has overcome the inertia of the casing and its connections, after which the lever may be further moved to force the arms 17 of the bell cranks past their centers into running position, without producing any sudden shock or strain on the parts.

The friction segments 12 may be formed of wood, fiber, leather, metal or other suitable material, and secured to the disk 9 by soft metal rivets 33 having countersunk heads as shown in Fig. 5, and as the surfaces of the contacting parts are worn, the wear may be taken up by the screws 22 until such time as the wear requires the substitution of new friction segments 12.

While my clutch is shown for operating a gear, it is manifest that the friction disk 3 and its flange 4 may be formed integral with or attached to a pulley or the like, without departing from the principle of construction and operation of my invention. I therefore do not limit myself to its application to gears.

What I claim to be new is—

1. In a friction clutch, in combination with a shaft, a friction disk, fixedly mounted on the shaft, a driving wheel loosely mounted on the shaft beside the friction disk, and provided with a cylindrical casing concentric around the friction disk, said casing having an inner end adapted to frictionally engage one side of the friction disk, an annular ring concentric within the casing between the friction disk and the outer end of the casing, and movable to engage and disengage the friction disk, an annular end plate secured to the outer end of the casing having cam projections on its inner face, and means to press the end of the casing and the annular ring oppositely against the friction disk, comprising a sleeve on the shaft adapted to move longitudinally of the shaft, and bell cranks pivotally connected to the annular ring and having arms connected to the sleeve and arms adapted to engage and disengage the cam projections of the annular end plate, substantially as set forth.

2. In a friction clutch, in combination with a shaft, a friction disk, fixedly mounted on the shaft, a driving wheel loosely mounted on the shaft beside the friction disk, and provided with a cylindrical casing concentric around the friction disk, said casing having an inner end adapted to frictionally engage one side of the friction disk, an annular ring concentric within the casing between the friction disk and the outer end of the casing, and movable to engage and disengage the friction disk, an annular end plate secured to the outer end of the casing having cam projections on its inner face, springs between the inner end of the casing and the annular ring, adapted to yieldingly hold the casing end and the annular ring disengaged from the friction disk, and means to press the end of the casing and the annular ring oppositely against the friction disk, comprising a sleeve on the shaft adapted to move longitudinally of the shaft, and bell cranks pivotally connected to the annular ring and having arms connected to the sleeve and arms adapted to engage and disengage the cam projections of the annular end plate, substantially as set forth.

3. A friction clutch comprising a shaft, a cylindrical casing having an end disk provided with a hub, adapted to be loosely mounted on the shaft, a hubbed friction disk, adapted to be fixedly mounted on the shaft, within and concentric to the casing, a friction ring, movable as a piston moves, within the flange, having its inner face adapted to engage the friction disk, and its outer face provided with lugs, an annular end plate secured to the open end of the casing, and having cam projections opposite the lugs of the ring, bell cranks pivoted to the lugs of the friction ring, having long arms extending towards the shaft, and having stop lugs adapted to limit the inward movement of the arms, and short arms having end rollers adapted to engage the cam projections of the annular end plate, and means mounted on the shaft and connected to the long arms of the bell cranks, adapted to be moved longitudinally of the shaft and thereby move the short arms of the bell crank to and from engagement with the cam projections of the end plate, substantially as set forth.

4. A friction clutch comprising a shaft, a cylindrical casing having an end disk provided with a hub, adapted to be loosely mounted on the shaft, a hubbed friction disk, adapted to be fixedly mounted on the shaft, within and concentric to the casing, a friction ring, movable as a piston moves, within the flange, having its inner face adapted to engage the friction disk, and its outer face provided with lugs, an annular end plate secured to the open end of the casing, and having cam faced plugs mounted in the end plate opposite the lugs of the friction ring, screws in the end plate adapted to adjust the inward projections of the plugs, bell cranks pivoted to the lugs of the friction ring having long arms extending towards the shaft, and provided with stop lugs adapted to limit the inward movement of the arms, and short arms having end rollers adapted to engage the cam faces of the plugs, and means mounted on the shaft and connected to the long arms of the bell cranks, adapted to be moved longitudinally of the shaft and thereby move the short arms of the bell cranks to and from engagement with the plugs of the end plates, substantially as set forth.

In witness whereof, I have hereunto signed my name in the presence of two subscribing witnesses, this 4th day of December, 1907.

PAUL M. H. LANGE.

In presence of—
  FRED H. KRUSE,
  M. S. SMITH.